Patented Jan. 29, 1946

2,393,755

UNITED STATES PATENT OFFICE 2,393,755

METHOD OF PREPARING HYDROXYARYL-AMINO TRIAZINES

Gaetano F. D'Alelio, Pittsfield, Mass., assignor to General Electric Company, a corporation of New York No Drawing. Application August 5, 1942, Serial No. 453,716

8 Claims. (Cl. 260—249.5)

This invention relates to the preparation of hydroxyarylamino triazines.

The triazine derivatives that are prepared in accordance with this invention may be represented by the following general formula:

I 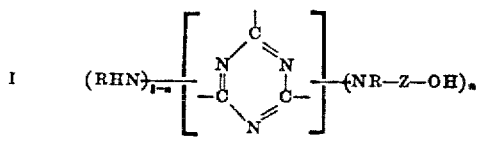

where $n$ represents an integer and is at least 1 and not more than 3, R represents a member of the class consisting of hydrogen and monovalent hydrocarbon and substituted hydrocarbon radicals, more particularly halo-hydrocarbon (halogenated hydrocarbon) radicals, and Z represents a member of the class consisting of divalent aromatic and substituted aromatic hydrocarbon radicals, more particularly halo-aromatic (halogenated aromatic) hydrocarbon radicals, the bond between Z and N being a carbon-to-nitrogen bond. From the foregoing formula it will be noted that when $n$ is 3, there will be no —NHR groups attached to the triazine nucleus.

Illustrative examples of monovalent radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, cinnamyl, phenylethyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, ethyl chlorophenyl, dichlorophenyl, chlorocyclohexyl, phenyl chloroethyl, bromoethyl, bromopropyl, fluorophenyl, iodophenyl, bromotolyl, etc. Preferably R is hydrogen. However, there also may be produced in accordance with the present invention compounds such, for instance, as those represented by the general formulas:

II 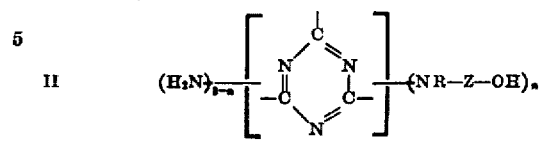

and

III 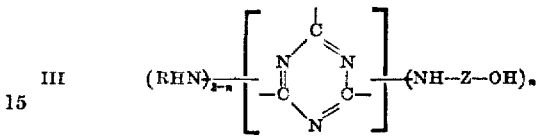

where $n$, R and Z have the same meanings as given above with reference to Formula I.

Illustrative examples of divalent radicals that Z in Formulas I, II and III may represent are: phenylene, xenylene, naphthylene, tolylenes, e. g., 2,5-tolylene, etc., xylylenes, e. g., para-(2,3-xylylene), etc., ethylphenylenes, propylphenylenes, butylphenylenes, allylphenylenes, methallylphenylenes, propenylphenylenes and other aliphatic-substituted phenylenes, the aliphatic-substituted naphthylenes, e. g., the mono-, di- and tri-methyl naphthylenes, the mono-, di- and tri-ethyl naphthylenes, the mono-, di- and tri-propyl naphthylenes, etc., the aromatic-substituted naphthylenes, e. g., the phenyl naphthylenes, etc., divalent aromatic radicals wherein one or more of the hydrogen atoms thereof are replaced by a substituent, e. g., halogeno, amino, acetyl, acetoxy, alkoxy, aryloxy, carboalkoxy, carboaroxy, sulfamyl, a hydroxy group or groups in addition to the single —OH group shown in the above formulas, an alkyl or alkenyl group or groups other than those specifically mentioned in the arylene radicals above set forth by way of illustration, etc. More specific examples of divalent, substituted aromatic hydrocarbon radicals are chlorophenylene, bromophenylene, chloronaphthylene, bromonaphthylene, bromo 2,5-tolylene, carbomethoxyphenylene, ethoxyphenylene, acetophenylene, acetoxyphenylene, aminophenylene, phenoxyphenylene, phenoxytolylene, sulfamylphenylene, methylphenylene (tolylene), etc. Preferably Z is phenylene or tolylene.

The compounds obtained by practicing this invention may be used, for example, as pharmaceuticals, insecticides, fungicides, plasticizers and as intermediates in the preparation of derivatives thereof such as methylol, methylene, etc., derivatives of the individual compound embraced by Formula I. They are especially useful and valuable in the preparation of synthetic compositions having particular utility in the plastics and coating arts, since they combine in one compound the advantages of the amino hydroxy aromatic hydrocarbons and the triazines. Thus, they may be condensed with, for instance, aldehydes, including polymeric aldehydes, hydroxyaldehydes and aldehyde-addition products to yield condensation products for use in various coating, impregnating, molding, laminating, casting and other applications. Such condensation products are more fully described and are specifically claimed in my copending application Serial No. 454,617, filed August 12, 1942, and assigned to the same assignee as the present invention.

Various methods may be employed to produce the chemical compounds embraced by Formula I. The claims of the present application are directed particularly to the first of the several methods described below.

*Method 1*

This method comprises effecting reaction under heat between a triamino [(—NHR)₃] triazine and an amino hydroxy aromatic hydrocarbon. This reaction may be represented by the following general equation:

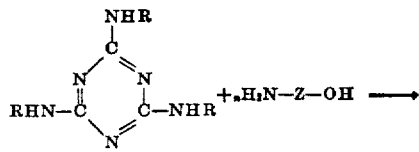

IV

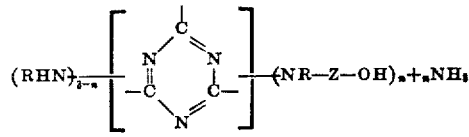

In the above equation $n$, $Z$ and $R$ have the same meanings as given above with reference to Formula I, the bond between Z and N in the reactant corresponding to the formula

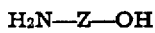

and, also, in the triazine derivative obtained as an end-product being a carbon-to-nitrogen bond. This reaction preferably is carried out in an inert organic solvent having a boiling point above 150° C., more particularly a dihydric alcohol having a boiling point above 150° C., for example ethylene glycol, propylene glycol, diethylene glycol, dipropylene glycol, etc.

Illustrative examples of aminotriazines that may be used, depending upon the particular end-product desired, are:

2,4,6-triamino s-triazine
2,4,6-tri-(methylamino) s-triazine
2,4,6-tri-(anilino) s-triazine
2,4,6-tri-(chloroanilino) s-triazine
2,4-diamino 6-ethylamino s-triazine
2-amino 4,6-di-(benzylamino) s-triazine
2,4,6-tri-(allylamino) s-triazine
2,4-diamino 6-naphthylamino s-triazine
2,4-diamino 6-toluido s-triazine
2-amino 4,6-di-(bromoanilino) s-triazine
2,4-diamino 6-chlorobutylamino s-triazine
2,4-diamino 6-cyclohexylamino s-triazine
2,4-di-(iodotoluido) 6-amino s-triazine
2,4,6-tri-(bromotoluido) s-triazine
2,4,6-tri-(fluoroanilino) s-triazine
2,4-di-(methylamino) 6-amino s-triazine
2,4-di-(ethylamino) 6-propylamino s-triazine
2-amino 4,6-di-(ethylamino) s-triazine
2,4-diamino 6-ethylamino s-triazine
2-amino 4-methylamino 6-anilino s-triazine
2,4,6-tri-(cyclohexylamino) s-triazine Illustrative examples of amino hydroxy aromatic hydrocarbons that may be used, depending upon the desired end-product, are:

The amino phenols
The amino cresols
The amino xylenols
The amino ethyl phenols
The amino naphthols
The amino chlorophenols

*Method 2*

Another suitable method of preparing the compounds embraced by Formula I comprises effecting reaction between an amino (—NHR) hydroxy aromatic hydrocarbon and a halogenated s-triazine. This reaction may be represented by the following general equation:

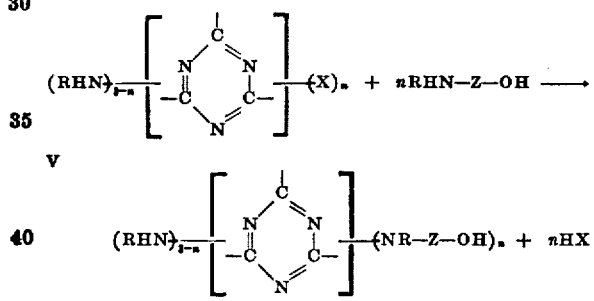

In the above equation X represents a halogen, and $n$, Z and R have the same meanings as given above with reference to Formula I. This reaction advantageously is carried out in an anhydrous liquid medium, e. g., ether, benzene, toluene, etc., or in an excess of the amino hydroxy aromatic hydrocarbon. After the reaction has been completed and the crude product obtained, the latter is suitably treated to remove the hydrohalide, for example by washing with a dilute aqueous solution of a base such as sodium or potassium hydroxide.

Illustrative examples of halogenated s-triazines that may be used, depending upon the particular end-product sought, are:

2-chloro 4,6-diamino s-triazine
2-bromo 4,6-diamino s-triazine
2,4-dichloro 6-amino s-triazine
2,4,6-trichloro s-triazine
2,4,6-tribromo s-triazine
2-iodo 4,6-diamino s-triazine
2-chloro 4,6-di-(ethylamino) s-triazine
2,4-dichloro 6-anilino s-triazine
2-chloro 4-ethylamino 6-amino s-triazine
2-chloro 4-methylamino 6-anilino s-triazine
2-bromo 4,6-di-(cyclohexylamino) s-triazine
2-chloro 4,6-di-(chloroanilino) s-triazine
2-chloro 4-benzylamino 6-amino s-triazine
2-chloro 4,6-di-(toluido) s-triazine Examples of amino hydroxy aromatic hydrocarbons that may be used, depending upon the desired end-product, are such as those mentioned above with reference to Method 1 and, in addition, amino hydroxy aromatic hydrocarbons such as mentioned in connection with Method 1 but wherein one of the hydrogen atoms of the amino grouping has been replaced by a hydrocarbon or a halo-hydrocarbon radical, numerous examples of which radicals have been given above with reference to R of Formula I.

Method 3

Another method, which is applicable only to the preparation of tri-(hydroxyarylamino) triazines, involves the reaction of a cyanogen halide with an amino hydroxy aromatic hydrocarbon. It is not known whether the reaction involves the reaction of the cyanogen halide with the amino hydroxy aromatic hydrocarbon to form a substituted cyanamide which then trimerizes to the substituted triazine or whether the reaction involves the trimerization of the cyanogen halide to a cyanuric halide which then reacts with the amino hydroxy aromatic hydrocarbon as outlined under Method 2. The reaction may be represented by the following general equation:

VI  

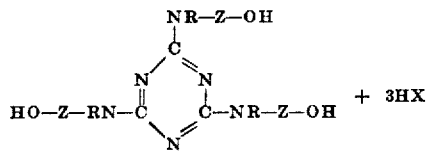

In the above equation X represents a halogen, e. g., chlorine, bromine, and Z and R have the same meanings as given above with reference to Formula I. Preferably X represents a chlorine atom.

Method 4

Another method which is suitable for use in preparing the chemical compounds embraced by Formula I comprises effecting reaction between (1) an amino hydroxy aromatic hydrocarbon having the general formula RHN—Z—OH, where R and Z have the same meanings as given above with reference to Formula I, and (2) a triazinyl aliphatic thioether selected from the class consisting of (a) mono-triazinyl aliphatic thioethers corresponding to the general formula VII  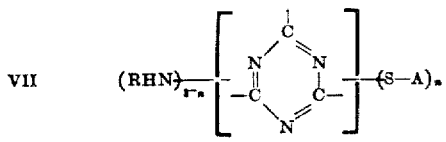

where A represents a monovalent aliphatic hydrocarbon radical, and $n$ and R have the same meanings as given above with reference to Formula I, and (b) bis-triazinyl aliphatic thioethers corresponding to the general formula VIII  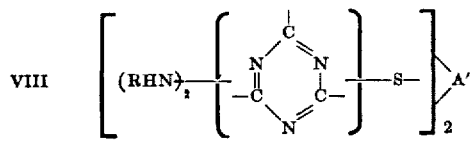

where A' represents a divalent aliphatic hydrocarbon radical selected from the class represented by B and (B—O—)$_m$—B', where B and B' represent divalent aliphatic hydrocarbon radicals, R has the same meaning as given above with reference to Formula I, and $m$ is a small integer, e. g., from 1 to 5. When a mono-triazinyl aliphatic thioether is used as a starting reactant, the reaction may be represented by the following general equation:

IX  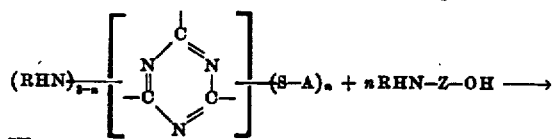

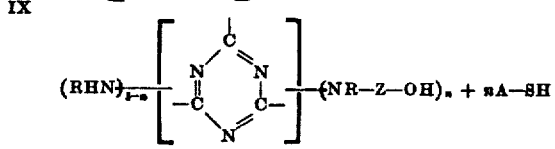

When a bis-triazinyl aliphatic thioether, e. g., a symmetrical bis-(diamino s-triazinyl thio) dialkyl ether, is used as a starting reactant, the reaction may be represented by the following general equation:

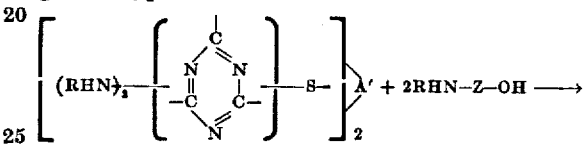

X

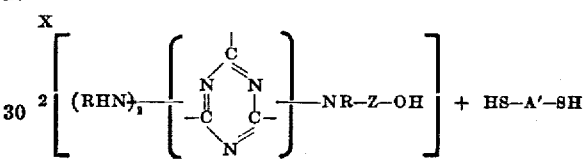

In Equations IX and X, A and A' have the same meanings as given above with reference to Formulas VII and VIII, respectively, and $n$ (Equation IX), R and Z have the same meanings as given above with reference to Formula I. The reactions represented by Equations IX and X are best carried out in a solvent for the reactants and at the reflux temperature of the mass.

Illustrative examples of mono-triazinyl aliphatic thioethers that may be used, depending upon the particular product sought, are:

2-ethylthio 4,6-diamino s-triazine
2-butylthio 4,6-di-(methylamino) s-triazine
2-allylthio 4,6-di-(anilino) s-triazine
2-methylthio 4-ethylthio 6-amino s-triazine
2-(3'-butenylthio) 4-toluido 6-benzylamino s-triazine
2-propylthio 4-chloroanilino 6-chlorobutylamino s-triazine
2,4-di-(ethylthio) 6-amino s-triazine
2-methylthio 4-propylthio 6-methylamino s-triazine
2,4-di-(allylthio) 6-anilino s-triazine
2,4,6-tri-(butylthio) s-triazine
2-methylthio 4-ethylthio 6-propylthio s-triazine
2,4,6-tri-(3'-butenylthio) s-triazine
2,4,6-tri-(ethylthio) s-triazine Illustrative examples of bis-triazinyl aliphatic thioethers that may be employed, depending upon the particular end-product desired, are:

Alpha, beta-bis-(diamino s-triazinyl thio) ethane
Alpha, gamma-bis-(diamino s-triazinyl thio) propane
Alpha, omega-bis-(diamino s-triazinyl thio) butane
Alpha, gamma-bis-[4,6-di-(ethylamino) s-triazinyl-2 thio] propane
Alpha, omega - bis - (4,6 - dianilino s-triazinyl-2 thio) butane
Beta, gamma-bis-[4,6-di-(benzylamino) s-triazinyl-2 thio] butane Alpha, beta - bis - (4-allylamino 6-chloroanilino s-triazinyl-2 thio) ethylene Alpha, alpha-bis-(4-toluido 6-amino s-triazinyl-2 thio) ethane Beta, beta'-bis-(diamino s-triazinyl thio) diethyl ether Beta, beta' - bis - (4 - methylamino 6 - naphthylamino s-triazinyl-2 thio) di-isopropyl ether Alpha, beta-bis-(diamino s-triazinyl thio) ethylene Alpha, alpha-bis-(diamino s-triazinyl thio) ethane Gamma, gamma'-bis-(diamino s-triazinyl thio) dipropyl ether Beta, beta'-bis-(diamino s-triazinyl thio) di-isobutyl ether Examples of amino hydroxy aromatic hydrocarbons that may be used are such as those mentioned above with reference to Methods 1 and 2.

In order that those skilled in the art better may understand how my invention may be carried into effect, the following examples are given by way of illustration and not by way of limitation. All parts are by weight.

*Example 1*

This example illustrates the preparation of 2-(para-hydroxyanilino) 4,6-diamino s-triazine, which also may be named 2-(para-hydroxyphenylamino) 4,6-diamino s-triazine and which has the formula

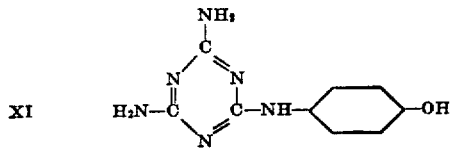

|  | Parts | Approx. mol ratio |
|---|---|---|
| Para-aminophenol | 109 | 1 |
| Melamine | 126 | 1 |
| Diethylene glycol | 800 | | were heated together under reflux utilizing the following time and temperature conditions:

8½ hours at 160° C.
18 hours at 180–190° C.
9 hours at 190–200° C.

After cooling the reaction mass, it was diluted with 5,000 parts water and the resulting impure crystals comprising 2-(para-hydroxyanilino) 4,6-diamino s-triazine were filtered off. These crystals were dissolved in boiling water and the resulting solution treated with a decolorizing carbon. White crystals of 2-(para-hydroxyanilino) 4,6-diamino s-triazine were obtained by recrystallization from the decolorized solution.

The corresponding ortho and meta derivatives are prepared as described above with the exception that, instead of para-aminophenol, there are used 109 parts of either ortho-aminophenol or meta-aminophenol depending upon the particular derivative desired.

*Example 2*

2-amino 4,6-di-(ortho-hydroxyphenylamino) s-triazine, 2-amino 4,6-di-(meta-hydroxyphenylamino) s-triazine and 2-amino 4,6-di-(para-hydroxyphenylamino) s-triazine are prepared in essentially the same manner as described under Example 1 with the exception that, instead of 109 parts of the aminophenol (ortho-, meta- or para-aminophenol), 218 parts (approximately 2 mols) of the aminophenol are employed.

*Example 3*

This example illustrates the preparation of 2,4,6-tri-(para-hydroxyphenylamino) s-triazine, which also may be named 2,4,6-tri-(para-hydroxyanilino) s-triazine.

|  | Parts | Approx. mol ratio |
|---|---|---|
| Para-aminophenol | 436 | 4 |
| Melamine | 126 | 1 |
| Diethylene glycol | 800 | | were heated together under reflux, using the same time and temperature conditions described under Example 1 with reference to the preparation of 2-(para-hydroxyphenylamino) 4,6-diamino s-triazine (para-hydroxyphenylamino diamino s-triazine). A molecular excess of the para-aminophenol was used, that is, 4 mols of para-aminophenol instead of 3 mols per mol of melamine, in order to obtain a maximum yield of the tri-substituted triazine within a reasonable reaction period. As in Example 1, the reaction mass was cooled, diluted with 5,000 parts of water and the resulting impure crystals of 2,4,6-tri-(para-hydroxyphenylamino) s-triazine [tri-(para-hydroxyphenylamino) s-triazine] filtered off. After dissolving these crystals in boiling water, the solution was decolorized by treatment with a decolorizing carbon. White crystals of 2,4,6-tri-(para-hydroxyphenylamino) s-triazine were obtained by recrystallization from the decolorized solution.

The corresponding ortho and meta derivatives are prepared as described above with the exception that, instead of para-aminophenol, there are used 436 parts of either ortho-aminophenol or meta-aminophenol, depending upon the particular derivative desired.

*Example 4*

The 2-(hydroxytolylamino) 4,6-diamino s-triazines, the 2-amino 4,6-di-(hydroxytolylamino) s-triazines and the 2,4,6-tri-(hydroxytolylamino) s-triazines are prepared as described under Examples 1, 2 and 3 with reference to the preparation of the corresponding hydroxyphenylamino derivatives with the exception that, instead of an aminophenol, an equivalent amount of an aminocresol (aminohydroxytoluene) is used.

*Example 5*

The 2-(hydroxyphenylamino) 4,6-di-(methylamino) s-triazines [hydroxyphenylamino di-(methylamino) s-triazines] are prepared in essentially the same manner as described under Example 1 with reference to the production of the 2-(hydroxyphenylamino) 4,6-diamino s-triazines with the exception that, instead of melamine, an equivalent amount of 2-amino 4,6-di-(methylamino) s-triazine is used.

From the foregoing description it will be seen that the present invention provides new and useful methods of making hydroxyarylamino triazines and (hydroxy-halogenoaryl amino) triazines, examples of which are the tri-(hydroxyarylamino) s-triazines, the tri-(hydroxy-halogenoaryl amino) s-triazines, the monoamino (—NHR) di-(hydroxyarylamino) s-triazines, the monoamino (—NHR) di-(hydroxy-halogenoaryl amino) s-triazines, the diamino [(—NHR)₂] mono-(hydroxyarylamino) s-triazines and the diamino [(—NHR)₂] mono-(hydroxyhalogenoaryl amino) s-triazines. Other and more specific examples of compounds embraced by Formula I that may be produced in accordance with the present invention are listed below:

Para-hydroxyphenylamino di-(propylamino) s-triazine, which also may be named 2-(para-hydroxyphenylamino) 4,6-di-(propylamino) s-triazine, 4-(para-hydroxyphenylamino) 2,6-di-(propylamino) s-triazine or 6-(para-hydroxyphenylamino) 2,4-di-(propylamino) s-triazine
Hydroxyphenylamino di-(phenethylamino) s-triazines
Hydroxytolylamino di-(benzylamino) s-triazines
Hydroxytolylamino di-(octylamino) s-triazines
Hydroxytolylamino di-(cyclopentylamino) s-triazines
Di-(hydroxytolylamino) methylamino s-triazines
Ortho-hydroxyphenylamino di-(ethylamino) s-triazine
Meta-hydroxyphenylamino di-(allylamino) s-triazine
Para-hydroxyphenylamino di-(cyclohexylamino) s-triazine
Hydroxytolylamino (di-(chloroanilino) s-triazines
(Hydroxy-chlorophenyl amino) diamino s-triazines
2-(para-hydroxyphenylamino) 4-ethylamino 6-amino s-triazine
Para-hydroxyphenylamino di-(ethylamino) s-triazine
2-(para-hydroxyphenylamino) 4-methylamino 6-anilino s-triazine
Alpha-hydroxynaphthylamino di-(ethylamino) s-triazine
Meta-hydroxyphenylamino di-(naphthylamino) s-triazine
Hydroxytolylamino di-(chloroethylamino) s-triazines
Hydroxyxylidino di-(chloroanilino) s-triazines
Hydroxyphenylamino di-(propylamino) s-triazines.
Hydroxyphenylamino di-(butenylamino) s-triazines
Hydroxyxylidino diamino s-triazines
Hydroxynaphthylamino diamino s-triazines
Hydroxyxenylamino diamino s-triazines
Di-(hydroxyxylidino) amino s-triazines
Di-(hydroxynaphthylamino) amino s-triazines
Di-(hydroxyxenylamino) amino s-triazines
Tri-(hydroxyvylidino) s-triazines
Tri-(hydroxyxylidino) s-triazines
Tri-(hydroxynaphthylamino) s-triazines
Di-(hydroxyphenylamino) ethylamino s-triazines
Di-(hydroxytolylamino) ethylamino s-triazines
Di-(hydroxynaphthylamino) allylamino s-triazines
Di-(hydroxyphenylamino) fluoroanilino s-triazines
(Hydroxy-bromophenyl amino) diamino s-triazines
Di-(hydroxyphenylamino) heptylamino s-triazines
Di-(hydroxy-chlorophenyl amino) amino s-triazines
Di-(hydroxy-bromophenyl amino) amino s-triazines
Tri-(hydroxy-chlorophenyl amino) s-triazines
Tri-(hydroxy-bromophenyl amino) s-triazines
Hydroxyphenylamino di-(bromotoluido) s-triazines
Di-(hydroxytolylamino) cyclohexenylamino s-triazines
Di-(hydroxynaphthylamino) iodoanilino s-triazines
2-(hydroxytolylamino) 4-anilino 6-naphthylamino s-triazines
2-(hydroxyphenylamino) 4-methylamino 6-ethylamino s-triazines
2-(hydroxyphenylamino) 4-methylamino 6-allylamino s-triazines
2-(hydroxytolylamino) 4-amino 6-cyclohexylamino s-triazines
2-(hydroxyphenylamino) 4-methylamino 6-chloroethylamino s-triazines In a manner similar to that described above with particular reference to the production of hydroxyarylamino 1,3,5- or symmetrical triazines (s-triazines), corresponding derivatives of the 1,2,4- or asymmetrical triazines and of the 1,2,3- or vicinal triazines may be prepared.

What I claim as new and desire to secure by Letters Patent of the United States is:

1. The method of preparing a triazine derivative corresponding to the general formula

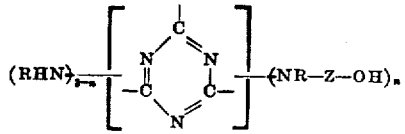

where $n$ represents an integer and is at least 1 and not more than 3, R represents a member of the class consisting of hydrogen and monovalent hydrocarbon and halo-hydrocarbon radicals, and Z represents a member of the class consisting of divalent aromatic and halo-aromatic hydrocarbon radicals, the bond between Z and N in the above formula being a carbon-to-nitrogen bond, said method comprising effecting reaction under heat and while admixed with a dihydric alcohol having a boiling point above 150° C. between a compound corresponding to the general formula

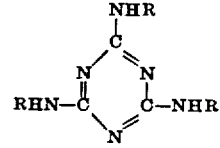

and a compound corresponding to the general formula $$nH_2N—Z—OH$$

where $n$, R and Z have the same meanings as given above, the bond between Z and N in the reactant corresponding to the formula $$H_2N—Z—OH$$

being a carbon-to-nitrogen bond, and isolating the triazine derivative thereby obtained.

2. A method as in claim 1 wherein the dihydric alcohol is diethylene glycol.

3. The method of preparing a symmetrical triazine having attached directly to the carbon atoms of the triazine nucleus at least one hydroxyphenylamino grouping, the remaining carbon atoms of the triazine nucleus having linkages that are not thus satisfied being connected to unsubstituted amino groupings, said method comprising effecting reaction under heat between melamine and an aminophenol while the said reactants are admixed with a dihydric alcohol having a boiling point above 150° C., and isolating the hydroxyphenylamino triazine thereby obtained.

4. The method of preparing para-hydroxyphenylamino diamino s-triazine which comprises effecting reaction under heat between melamine and para-aminophenol in approximately equimolecular proportions, said reaction being carried out while the reactants are dissolved in a dihydric alcohol having a boiling point above 150° C., and isolating the para-hydroxyphenylamino diamino s-triazine thereby obtained.

5. A method as in claim 4 wherein the dihydric alcohol is diethylene glycol.

6. The method of preparing a hydroxyphenylamino diamino s-triazine which comprises effecting reaction at a temperature within the range of 160° to 200° C. between melamine and an aminophenol, said reaction being carried out while the said reactants are admixed with a dihydric alcohol having a boiling point above 150° C., and isolating the hydroxyphenylamino diamino s-triazine thereby obtained.

7. The method of preparing para-hydroxyphenylamino diamino s-triazine which comprises effecting reaction between approximately equimolecular proportions of melamine and para-aminophenol while the said reactants are admixed with diethylene glycol, said reaction being effected by heating the mass under reflux at a gradually increasing temperature ranging from 160° C. to 200° C. for a period of the order of 35½ hours, and isolating and purifying the resulting para-hydroxyphenylamino diamino s-triazine.

8. The method of preparing para-hydroxyphenylamino diamino s-triazine which comprises effecting reaction between approximately equimolecular proportions of melamine and para-aminophenol while the said reactants are admixed with diethylene glycol, said reaction being effected by heating the mass under reflux utilizing the following time and temperature conditions:

8½ hours at 160° C.
18 hours at 180–190° C.
9 hours at 190–200° C., cooling the reaction mass, diluting it with water, filtering off the impure crystals comprising para-hydroxyphenylamino diamino s-triazine that separate from the cooled, diluted mass, dissolving the impure crystals in water, treating the resulting solution with a decolorizing carbon, and recrystallizing para-hydroxyphenylamino diamino s-triazine from the decolorized solution.

GAETANO F. D'ALELIO.

Certificate of Correction

Patent No. 2,393,755.  January 29, 1946.

GAETANO F. D'ALELIO

It is hereby certified that errors appear in the printed specification of the above numbered patent requiring correction as follows: Page 4, second column, line 27, Example 3, before "water" strike out of; page 5, first column, line 53, Example 5, for "(hydroxyvylidino)" read (hydroxyxylidino); line 54, for "(hydroxyxylidino)" read (hydroxyrenylamino); and that the said Letters Patent should be read with these corrections therein that the same may conform to the record of the case in the Patent Office.

Signed and sealed this 6th day of August, A. D. 1946.

[SEAL]

LESLIE FRAZER,
*First Assistant Commissioner of Patents.* and para-aminophenol in approximately equimolecular proportions, said reaction being carried out while the reactants are dissolved in a dihydric alcohol having a boiling point above 150° C., and isolating the para-hydroxyphenylamino diamino s-triazine thereby obtained.

5. A method as in claim 4 wherein the dihydric alcohol is diethylene glycol.

6. The method of preparing a hydroxyphenylamino diamino s-triazine which comprises effecting reaction at a temperature within the range of 160° to 200° C. between melamine and an aminophenol, said reaction being carried out while the said reactants are admixed with a dihydric alcohol having a boiling point above 150° C., and isolating the hydroxyphenylamino diamino s-triazine thereby obtained.

7. The method of preparing para-hydroxyphenylamino diamino s-triazine which comprises effecting reaction between approximately equimolecular proportions of melamine and para-aminophenol while the said reactants are admixed with diethylene glycol, said reaction being effected by heating the mass under reflux at a gradually increasing temperature ranging from 160° C. to 200° C. for a period of the order of 35½ hours, and isolating and purifying the resulting para-hydroxyphenylamino diamino s-triazine.

8. The method of preparing para-hydroxyphenylamino diamino s-triazine which comprises effecting reaction between approximately equimolecular proportions of melamine and para-aminophenol while the said reactants are admixed with diethylene glycol, said reaction being effected by heating the mass under reflux utilizing the following time and temperature conditions:

8½ hours at 160° C.
18 hours at 180–190° C.
9 hours at 190–200° C., cooling the reaction mass, diluting it with water, filtering off the impure crystals comprising para-hydroxyphenylamino diamino s-triazine that separate from the cooled, diluted mass, dissolving the impure crystals in water, treating the resulting solution with a decolorizing carbon, and recrystallizing para-hydroxyphenylamino diamino s-triazine from the decolorized solution.

GAETANO F. D'ALELIO.

Certificate of Correction

Patent No. 2,393,755. January 29, 1946.

GAETANO F. D'ALELIO

It is hereby certified that errors appear in the printed specification of the above numbered patent requiring correction as follows: Page 4, second column, line 27, Example 3, before "water" strike out *of*; page 5, first column, line 53, Example 5, for "(hydroxyvylidino)" read *(hydroxyxylidino)*; line 54, for "(hydroxyxylidino)" read *(hydroxyrenylamino)*; and that the said Letters Patent should be read with these corrections therein that the same may conform to the record of the case in the Patent Office.

Signed and sealed this 6th day of August, A. D. 1946.

[SEAL]

LESLIE FRAZER,
*First Assistant Commissioner of Patents.*